(12) United States Patent
Shaer

(10) Patent No.: US 11,193,447 B2
(45) Date of Patent: Dec. 7, 2021

(54) PISTON AND CYLINDER OF AN INTERNAL COMBUSTION ENGINE AND INTERNAL COMBUSTION ENGINE

(71) Applicant: MAN Energy Solutions SE, Augsburg (DE)

(72) Inventor: Talat Shaer, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 17/002,679

(22) Filed: Aug. 25, 2020

(65) Prior Publication Data
US 2021/0062753 A1 Mar. 4, 2021

(30) Foreign Application Priority Data
Aug. 27, 2019 (DE) .................. 10 2019 122 878.6

(51) Int. Cl.
| | |
|---|---|
| *F16J 9/26* | (2006.01) |
| *F16J 10/04* | (2006.01) |
| *F02F 3/12* | (2006.01) |
| *F02F 3/00* | (2006.01) |
| *F01P 3/06* | (2006.01) |
| *F02F 1/00* | (2006.01) |
| *F16J 9/00* | (2006.01) |

(52) U.S. Cl.
CPC .................. *F02F 3/12* (2013.01); *F01P 3/06* (2013.01); *F02F 1/004* (2013.01); *F02F 3/0084* (2013.01); *F16J 9/00* (2013.01)

(58) Field of Classification Search
CPC ....... F16J 9/26; F16J 10/04; F02F 3/12; F02F 3/00
See application file for complete search history.

(56) References Cited

U.S. PATENT DOCUMENTS

| | | | | |
|---|---|---|---|---|
| 5,122,226 | A * | 6/1992 | Minford | .................. B29C 70/86 216/34 |
| 5,486,299 | A * | 1/1996 | Fuwa | .................... C10M 147/02 508/106 |
| 5,560,283 | A * | 10/1996 | Hannig | ...................... F02F 3/10 92/208 |
| 10,443,537 | B2 * | 10/2019 | Lineton | ...................... B32B 3/06 |
| 2016/0273483 | A1 * | 9/2016 | Yamashita | ................ F02F 3/12 |
| 2018/0179644 | A1 * | 6/2018 | Koeberlein | .............. F02B 75/28 |
| 2018/0216524 | A1 * | 8/2018 | Lineton | .................... C23C 28/32 |
| 2019/0257265 | A1 * | 8/2019 | Lineton | ..................... F02F 3/16 |

FOREIGN PATENT DOCUMENTS

| | | |
|---|---|---|
| DE | 41 13 773 | 1/1992 |
| DE | 42 40 050 | 6/1994 |
| DE | 10 2013 009 415 | 12/2014 |
| EP | 2 243 940 | 3/2010 |

* cited by examiner

*Primary Examiner* — Long T Tran
(74) *Attorney, Agent, or Firm* — Cozen O'Connor

(57) ABSTRACT

A piston of a cylinder of an internal combustion engine includes: an upper piston crown; a radially outer surface; a plurality grooves arranged on the radially outer surface; and a plurality of piston rings each positioned in a respective one of the grooves. The radially outer surface forms a top land arranged between the upper piston crown and an uppermost one of the grooves of the piston, and the top land has an axial length and a non-abrasion-proof coating.

12 Claims, 2 Drawing Sheets

PISTON AND CYLINDER OF AN INTERNAL COMBUSTION ENGINE AND INTERNAL COMBUSTION ENGINE

BACKGROUND OF THE INVENTION

1. Field of the Invention

The invention relates to a piston of a cylinder of an internal combustion engine, to a cylinder of an internal combustion engine and to an internal combustion engine.

2. Description of the Related Art

From DE 10 2013 009 415 A1 a piston of a cylinder of an internal combustion engine is known, which is moveably guided, up and down, in a cylinder liner. In a recess of the cylinder liner, a flame ring is positioned. Into a radially outer surface of the piston, grooves are introduced which accommodate the piston rings. Between a front or upper piston crown of the piston and the uppermost or front-most groove of the piston, the radial outer surface of the piston forms a so-called top land, wherein the flame ring of the cylinder liner serves, among other things, for scraping off deposits from the radially outer surface of the piston, in particular in the region of the top land.

Between the radially outer surface of the piston, namely the top land, and the flame ring a clearance is necessary in order to make possible undisturbed moving of the piston in the cylinder liner. In this clearance between piston and flame ring, a so-called waste volume forms, in which a fuel mixture can collect, which participates in the combustion only ineffectively. For reducing the waste volume and thus for increasing the engine efficiency, the clearance between the piston and the flame ring is selected, according to the prior art, as small as possible. This requires high manufacturing tolerances.

From DE 10 2013 009 415 A1 it is known, for reducing the waste volume, to pull the piston crown, at the radially outer edge, axially to the back.

SUMMARY OF THE INVENTION

Starting out from this, it is an object of the present invention to create a new type of piston of a cylinder of an internal combustion engine, a cylinder of an internal combustion engine and an internal combustion engine.

This object may be achieved by a piston having a top land. The piston, in the region of the top land, comprises or carries a soft, non-abrasion-proof coating. During a local contact of the top land of the piston with the flame ring developing during the operation, the coating can be locally removed to exactly set the clearance necessary for operation between piston and flame ring, namely without demanding high manufacturing tolerances. By way of the non-abrasion-proof coating, the waste volume between piston and flame ring can be minimized and the engine efficiency increased.

Preferentially, the non-abrasion-proof coating consists of resin-bonded graphite. Such a coating is particularly preferred in order to set, during the engine operation, the clearance necessary for the operation between piston and flame ring by local abrasion of the coating.

According to a further development of the invention, the non-abrasion-proof coating has a thickness between 0.02 mm and 0.2 mm, preferentially between 0.05 mm and 0.15 mm. This thickness of the non-abrasion-proof coating is particularly preferred in order to set during the engine operation, the clearance between piston and flame ring necessary for the operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention relates to an internal combustion engine, an internal combustion engine comprises at least one cylinder.

Preferred further developments of the invention are obtained from the following description. Exemplary embodiments of the invention are explained in more detail by way of the drawings without being restricted to this. In the drawings.

DETAILED DESCRIPTION OF THE PRESENTLY PREFERRED EMBODIMENTS

Figure 1:
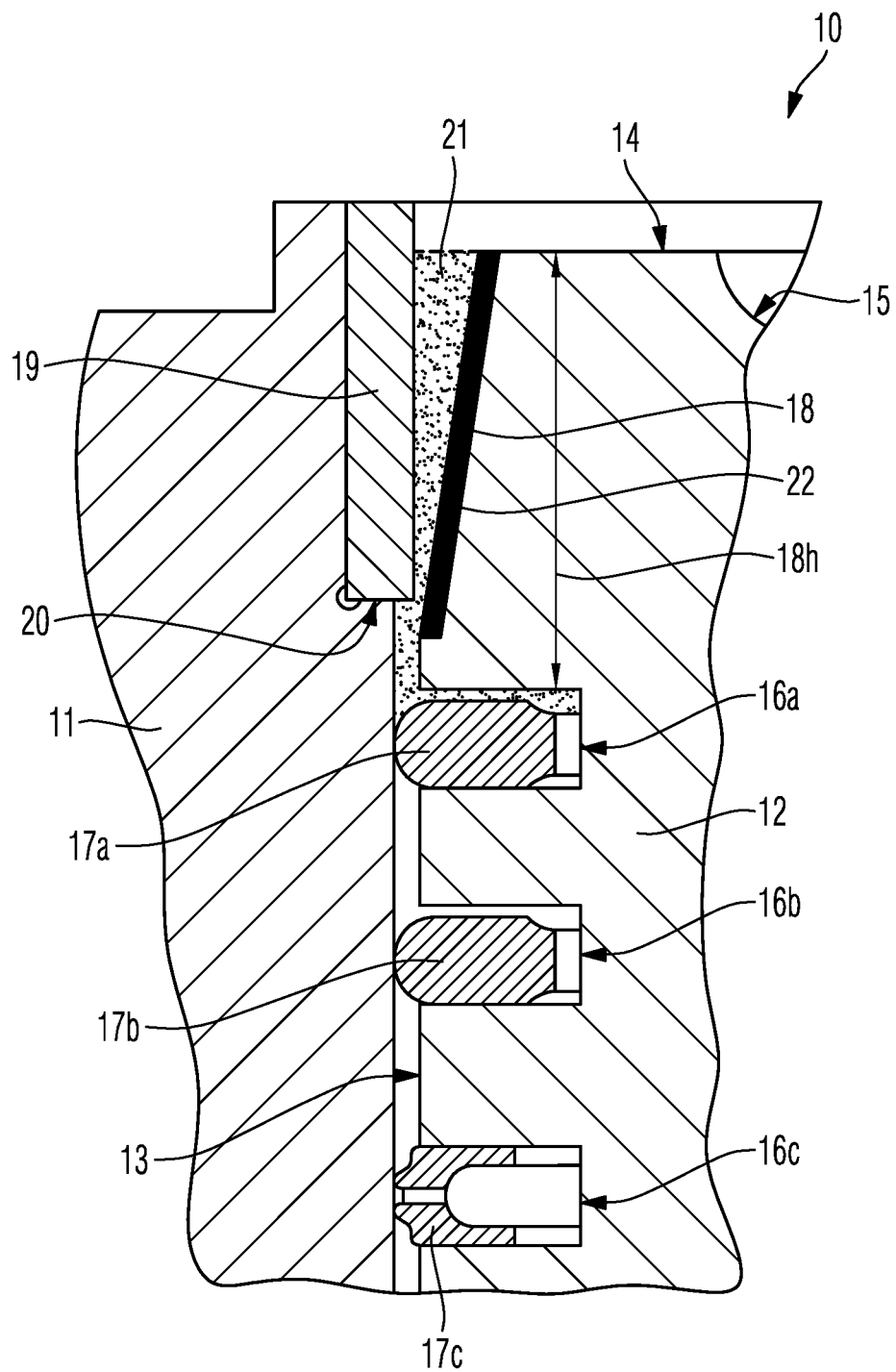
FIG. 1 is a cross section in the form of an extract through a first cylinder according to the invention of an internal combustion engine according to the invention.

FIG. 1 shows an extract of a cylinder 10 of an internal combustion engine according to the invention as per a first exemplary embodiment of the invention in the region of a cylinder liner 11, and of a piston 12 that is moveably guided, up and down, in the cylinder liner 11. The piston 12 has a radially outer surface 13 and a front or upper piston crown 14. In the piston crown 14, a trough 15 can be centrally introduced. On its radially outer surface 13, the piston 12 comprises grooves 16a, 16b and 16c. Piston rings 17a, 17b, 17c are inserted into these grooves 16a, 16b and 16c, respectively of the piston 12. The two upper piston rings 17a, 17b are referred to as compression rings and the lower piston ring 17c as an oil scraper ring.

A top land 18 of the piston 12 extends between the piston crown 14 and the uppermost or front-most groove 16a of the piston 12. The distance between the uppermost or front-most groove 16a of the piston 12 and the piston crown 14c is referred to as top land height 18h of the top land 18.

The cylinder liner 11 accommodates a flame ring 19. The flame ring 19 is inserted into a recess 20 of the cylinder liner 11. During operation, the piston 12 can be cleaned in the region of its top land 18 with the help of the flame ring 19. In particular, the flame ring 19 serves for scraping off deposits, such as, for example, coke, from the radially outer surface 13 of the piston 12 in the region of the top land 18 and thus in the region of the top land height 18h.

In the exemplary embodiment shown in FIG. 1, an outer diameter of the radially outer surface 13 conically decreases in the region of the top land 18, seen from the front-most or uppermost groove 16a, in the direction of the piston crown 14, at least in regions. Between the top land 18 and the flame ring 19, a free space 21 is formed, which determines the clearance between the flame ring 19 and the top land 18 of the piston 12. In this free space 21, fuel can collect during engine operation, which is only inefficiently combusted. For this reason, this free space 21 is also referred to as a waste volume.

In order to keep the waste volume 21 as low as possible even with low manufacturing tolerances and an increase the efficiency of an internal combustion engine, the top land 18 carries a non-abrasion-proof coating 22 radially outside.

This relatively soft, non-abrasion-proof coating 22 can be removed during a local contact between the top land 18 and the flame ring 19, to thereby set the clearance necessary for operation between the top land 18 of the piston 12 and the flame ring 19 to a minimum during the engine operation. This increases the efficiency of the engine.

The non-abrasion-proof coating 22 is preferentially a coating of resin-bonded graphite.

The piston 12 is preferentially a piston assembled from a piston lower part that is not shown and a piston upper part, wherein piston lower part and piston upper part can both consist of steel or cast iron, in particular spheroidal graphite cast iron. Light metal can also be utilized.

The non-abrasion-proof coating 22 consists of a softer material than the material of the piston lower part and of the piston upper part. Furthermore, the non-abrasion-proof coating 22 consists of a softer material than the flame ring 19 and the cylinder liner 11.

Further properties of the non-abrasion-proof coating 22 are a temperature resistance up to 250° C., a resistance to attacks by fuel and lubricating oil, and a good adhesion/bonding. The hardness of the coating 22 preferably is in a hardness range from 10-50 HB (Brinell). Soft materials such as, for example, resin-bonded graphite or heat-resistant plastics satisfy these properties.

The non-abrasion-proof coating 22 of preferentially resin-bonded graphite preferentially has a thickness between 0.02 mm and 0.2 mm, preferably between 0.05 mm and 0.15 mm.

In the exemplary embodiment of FIG. 1, the non-abrasion-proof coating 22 is applied to that region of the top land 18, which, emanating from the uppermost or front-most groove 16a, conically tapers in the direction of the piston crown 14. Here, the coating 22 is applied to this region over its entire axial extent or over its entire axial length. Accordingly, the coating 22 in FIG. 1 ends in the region of the piston crown 14.

Figure 2:
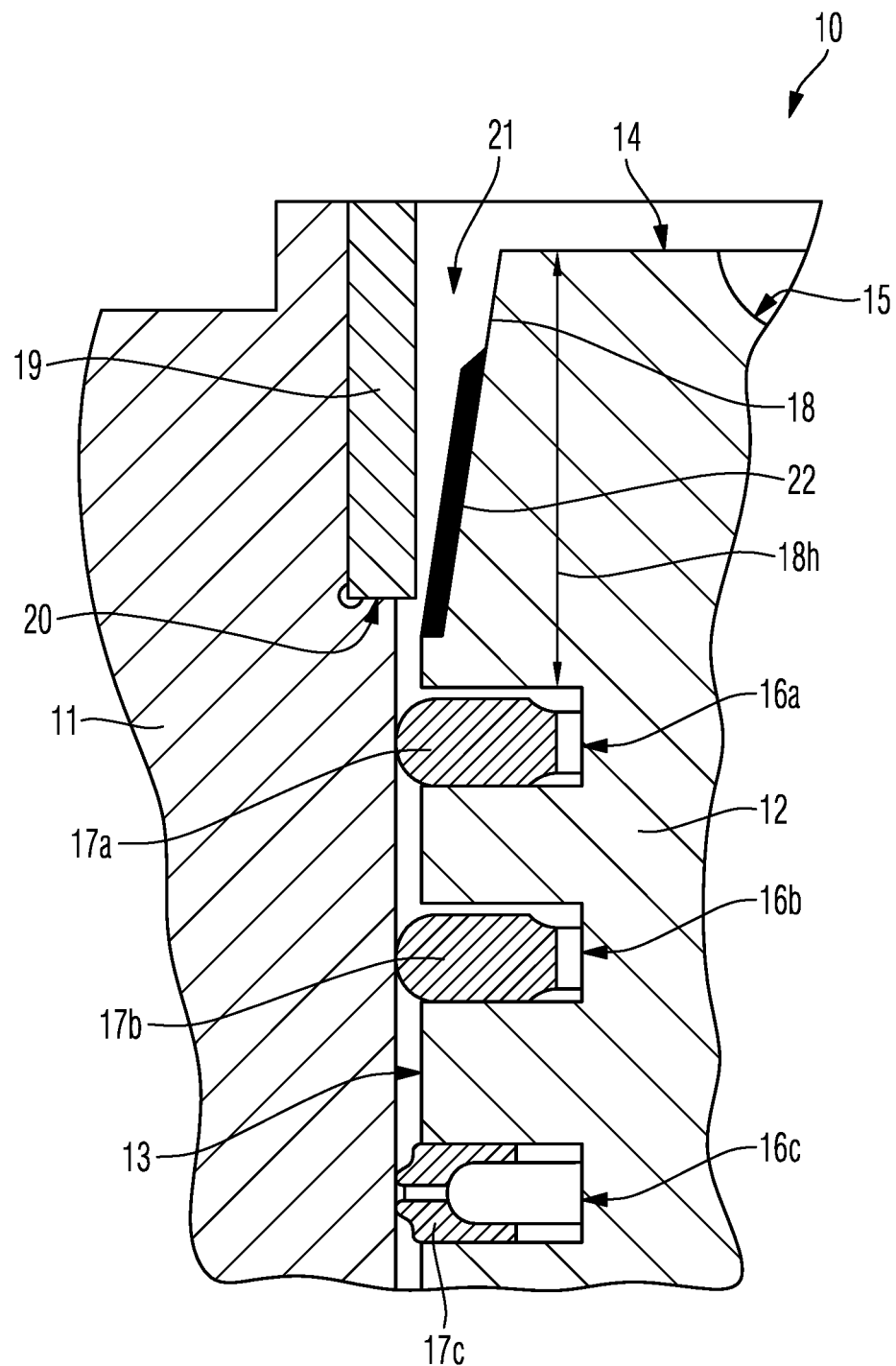
FIG. 2 is a cross section in the form of an extract through a second cylinder according to the invention of an internal combustion engine according to the invention.

Compared with this, FIG. 2 shows a modification of the invention in which the non-abrasion-proof coating 22 is configured shorter and ends at a distance from the piston crown 14.

Preferentially, the piston 12 according to the invention is an oil-cooled piston.

The invention does not only relate to the piston 12 as such but rather also to a cylinder 10 with a cylinder liner 11 and a piston 12 according to the invention, as well as an internal combustion engine having at least one, preferentially multiple, such cylinder/s 10.

With the invention it is possible to improve the engine efficiency namely by reducing the waste volume 21 between flame ring 19 and top land 18.

The invention can be employed both with diesel internal combustion engines and also with spark-ignition gas engines as well as dual-fuel engines, namely both with two-stroke and also with four-stroke internal combustion engines. The invention is employed in particular with pistons of large engines such as diesel engines or gas engines or diesel-gas engines on ships, the outer diameter of which is in particular in the range between 100 mm and 600 mm.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMBERS

10 Cylinder
11 Cylinder liner
12 Piston
13 Surface
14 Piston crown
15 Piston trough
16a Groove
16b Groove
16c Groove
17a Piston ring
17b Piston ring
17c Piston ring
18 Top land
18h Top land height
19 Flame ring
20 Recess
21 Free space/waste volume
22 Coating

What is claimed is:

1. A piston (12) of a cylinder (10) of an internal combustion engine, comprising:
    an upper piston crown (14);
    a radially outer surface (13);
    a plurality grooves (16a, 16b, 16c) arranged on the radially outer surface (13); and
    a plurality of piston rings (17a, 17b, 17c) each positioned in a respective one of the grooves (16a, 16b, 16c),
    wherein the radially outer surface (13) forms a top land (18) arranged between the upper piston crown (14) and an uppermost one of the grooves (16a) of the piston (12), the radially outer surface (13) having a diameter that conically decreases in a region of the top land (18), and
    wherein the top land (18) has an axial length and wherein a non-abrasion-proof coating (22) is arranged radially outside the top land (18) only in the region of the top land (18) over which the diameter conically decreases.

2. The piston according to claim 1, wherein the non-abrasion-proof coating (22) consists of resin-bonded graphite.

3. The piston according to claim 2, wherein the non-abrasion-proof coating (22) has a thickness between 0.02 and 0.2 mm.

4. The piston according to claim 2, wherein the non-abrasion-proof coating (22) has a thickness between 0.05 and 0.15 mm.

5. The piston according to claim 1, wherein the non-abrasion-proof coating (22) extends over an entirety of the axial length of the top land (18).

6. The piston according to claim 1, wherein the non-abrasion-proof coating (22) extends over a part region of the axial length of the top land (18).

7. The piston according to claim 6, wherein the non-abrasion-proof coating (22), seen from an end of the top land (18) facing away from the piston crown (14), extends in the direction of the piston crown (14) over the part region of the axial length of the top land (18) and ends at a distance from the piston crown (14).

8. The piston according to claim 1, wherein the piston comprises a piston lower part and a piston upper part connected to the piston lower part, wherein the top land (18) is formed on the piston upper part, which consists of steel or cast iron.

9. The piston according to claim 8, wherein the piston upper part consists of spheroidal graphite cast iron.

10. The piston according to claim 1, wherein the piston is oil-cooled.

11. A cylinder (10) of an internal combustion engine, the cylinder comprising:
 a cylinder liner (11) having a recess (20) configured to accommodate a flame ring (19); and
 the piston (12) according to claim 1, the piston being moveably guidable, up and down, in the cylinder liner (11), the non-abrasion-proof coating (22) being arranged radially outside the top land (18) in a gap formed between the flame ring (19) and the region of the top land (18) over which the diameter conically decreases.

12. An internal combustion engine, having at least one cylinder (10) according to claim 11.

* * * * *